ized in that

United States Patent [19]

Todo et al.

[11] Patent Number: 5,459,217

[45] Date of Patent: Oct. 17, 1995

[54] ETHYLENE/ALPHA-OLEFIN COPOLYMER

[75] Inventors: Akira Todo; Mamoru Takahashi; Seiichi Ikeyama; Toshiyuki Tsutsui, all of Kuga, Japan

[73] Assignee: Mitsui Petrochemical Industries, Ltd., Tokyo, Japan

[21] Appl. No.: 345,793

[22] Filed: Nov. 22, 1994

Related U.S. Application Data

[63] Continuation of Ser. No. 245,838, May 19, 1994, abandoned, which is a continuation of Ser. No. 47,423, Apr. 15, 1993, abandoned.

[51] Int. Cl.$^6$ .......................... C08F 10/02; C08F 210/02
[52] U.S. Cl. ...................... 526/348.1; 526/160; 526/348; 526/348.2; 526/348.3; 526/348.5; 526/348.6
[58] Field of Search ...................... 526/160, 348, 526/348.1, 348.2, 348.3, 348.5, 348.6

[56] References Cited

U.S. PATENT DOCUMENTS

| | | | |
|---|---|---|---|
| 5,026,797 | 6/1991 | Takahashi | 526/124 |
| 5,122,491 | 6/1992 | Kioka et al. | 502/117 |
| 5,171,799 | 12/1992 | Kioka et al. | 526/127 |
| 5,218,071 | 6/1993 | Tsutsui et al. | 526/348 |

FOREIGN PATENT DOCUMENTS 406912   1/1991   European Pat. Off. .

*Primary Examiner*—David W. Wu
*Attorney, Agent, or Firm*—Sherman and Shalloway

[57] ABSTRACT

The present invention provides an ethylene/α-olefin copolymer comprising constituent units (a) derived from ethylene and constituent units (b) derived from an α-olefin having 3 to 20 carbon atoms, the ethylene copolymer being characterized in that (A) the ethylene/α-olefin copolymer has a density (d) of 0.88 to 0.95 g/cm$^3$;

(B) the ethylene/α-olefin copolymer has a MFR of 0.01 to 200 g/10 min as measured at a temperature of 190° C. and a load of 2.16 kg;

(C) the temperature (Tm) at which the exothermic curve of the ethylene/α-olefin copolymer measured by a differential scanning calorimeter (DSC) shows the highest peak and the density (d) satisfy the relation $Tm<400d-250$;

(D) the quantity fraction (W) of a n-decane-soluble component at room temperature satisfy the relation, in the case of MFR≦10 g/10 min., $W<80\times exp(-100(d-0.88))+0.1$ in the case of MFR≧10 g/10 min., $W<80\times(MFR-9)^{0.35}\times exp(-100(d-0.88))+0.1$;

(E) the flow index (FI) defined by a shear rate which is given when a shear stress of molten copolymer at 190° C. reaches $2.4\times10^6$ dyne/cm$^2$ satisfy the relation, $FI>75\times MFR$; and (F) the melt tension (MT) at 190° C. and MFR of the copolymer satisfy the relation, $3.98\times MFR^{-0.66}>MT>2\times MFR^{-0.65}$.

5 Claims, 1 Drawing Sheet

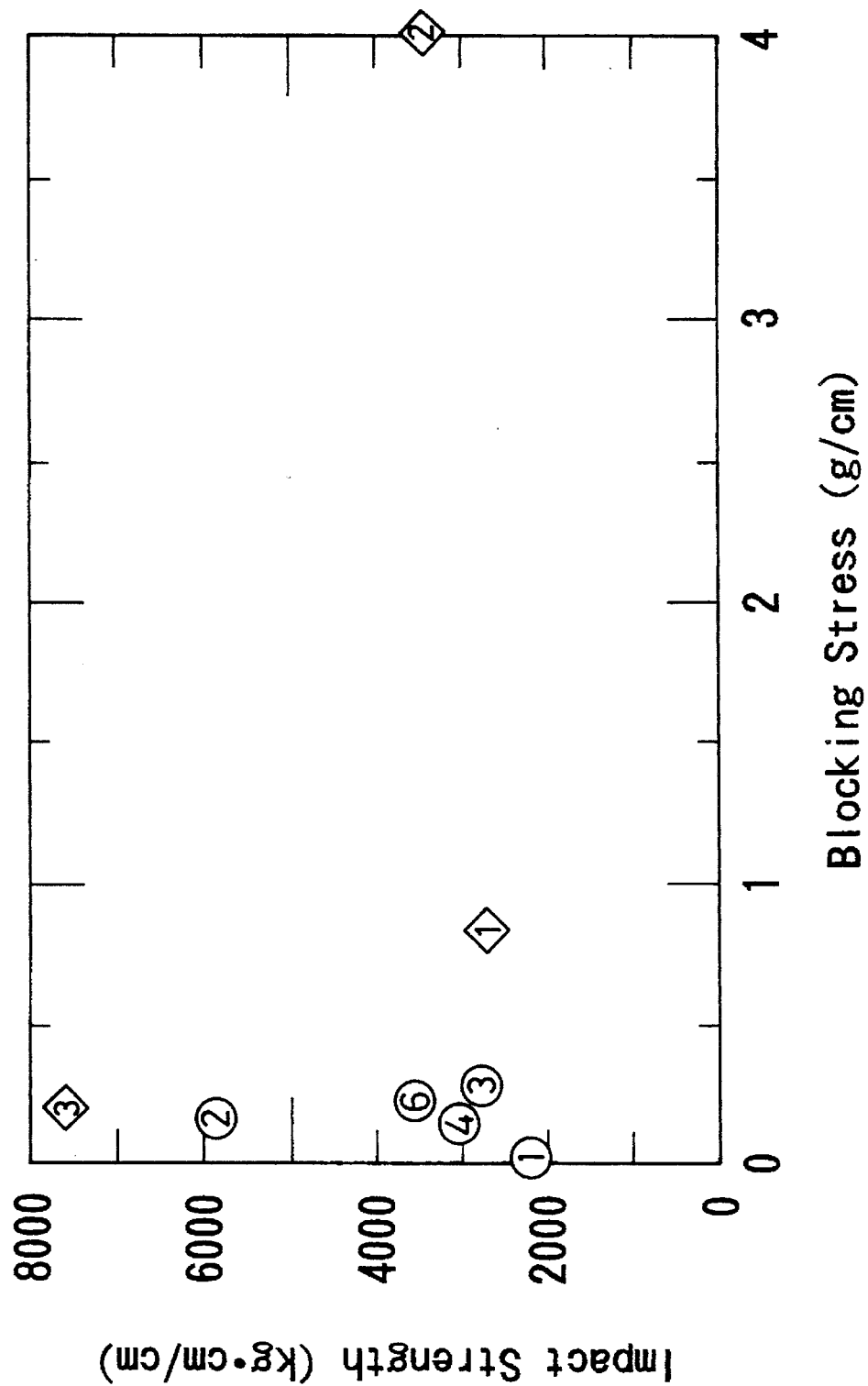

ETHYLENE/ALPHA-OLEFIN COPOLYMER

This application is a continuation of application Ser. No. 08/245,838, filed May 19, 1994, now abandoned; which is a continuation of application Ser. No. 08/047,423, filed Apr. 15, 1993, now abandoned.

FIELD OF THE INVENTION

The present invention relates to a novel ethylene/α-olefin copolymer, more particularly to a novel ethylene/α-olefin copolymer having a narrow composition distribution, an excellent flowability, an excellent melt tension and an excellent heat stability compared with known ethylene copolymers.

BACKGROUND OF THE INVENTION

Ethylene copolymers have heretofore been molded by various molding methods, and used in many fields. The requirement for the characteristics of the ethylene copolymers differs depending on the molding methods and uses. For example, when an inflation film is molded at a high speed, it is necessary to select an ethylene copolymer having a high melt tension compared with its molecular weight in order to stably conduct high speed molding without fluctuation or tearing of bubbles. An ethylene copolymer is required to have similar characteristics in order to prevent sag or tearing in blow molding, or to suppress width shortage to the minimum range in T-die molding.

Further, in extrusion molding, it is important to have an excellent flowability under high shearing during extrusion in order to improve quality of molded article and reduce electric power consumption.

A high-pressure low density polyethylene has a high melt tension compared with an ethylene copolymer prepared with a Ziegler type catalyst, and is used as a material for films and hollow containers. The high-pressure low density polyethylene as described above has low mechanical strength such as tensile strength, tear strength and impact strength, and in addition it has also low heat resistance, low stress cracking resistance, etc.

Of the ethylene polymers obtained during using Ziegler type catalysts, an ethylene polymer obtained by chromium type catalyst is relatively excellent in melt tension but inferior in heat stability.

On the other hand, Japanese Patent L-O-P Nos. 90810/1981 and 106806/1985 propose a method for improving the melt tension and blow ratio (die/swell ratio) of ethylene polymers obtained by using Ziegler type catalysts, especially a titanium type catalyst.

The ethylene polymers obtained by using a titanium catalyst, however, especially the low density ethylene polymers generally have problems such as their broad composition distribution and stickiness of their molded articles such as films.

Accordingly, the advent of ethylene polymers having an excellent melt tension, a high flowability, a narrow composition distribution, and an excellent heat stability will industrially be of great value.

There has recently been developed a new Ziegler type catalyst for olefin polymerization comprising a zirconium compound and an aluminoxane, said catalyst being capable of producing ethylene/α-olefin copolymers with high polymerization activities. There has also been proposed a process for the preparation of ethylene/α-olefin copolymers using such a new type catalyst.

For example, Japanese Patent L-O-P No. 19309/1983 discloses a process for polymerizing ethylene with one or at least two $C_3$–$C_{12}$ α-olefins at a temperature of −50° to 200° C. in the presence of a catalyst composed of a transition metal compound represented by the formula

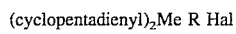

wherein R is cyclopentadienyl, $C_1$–$C_6$ alkyl or halogen, Me is a transition metal and Hal is halogen, and a linear aluminoxane represented by the formula

wherein R is methyl or ethyl, and n is a number of 4 to 20, or a cyclic aluminoxane represented by the formula

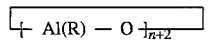

wherein R and n are as defined above. Japanese Patent L-O-P No. 19309/1983 discloses an invention relating to processes for preparing a linear aluminoxane represented by the formula

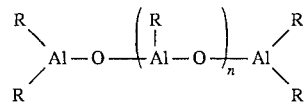

wherein n is a number of 2 to 40, and R is $C_1$–$C_8$ alkyl, and a cyclic aluminoxane represented by the formula

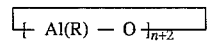

wherein n and R are as defined above. The same Patent Publication also discloses a process for the polymerization of olefin using a catalyst prepared by mixing, for example, methylaluminoxane prepared by the above-mentioned process and a bis (cyclopentadienyl) compound of titanium or zirconium. Japanese Patent L-O-P No. 35005/1985 discloses a process for preparing an olefin polymerization catalyst, wherein the process comprises reacting an aluminoxane represented by the formula

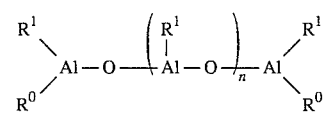

wherein $R^1$ is $C_1$–$C_{10}$ alkyl, and $R^0$ is $R^1$ or $R^0$ represents—O— by linkage, with a magnesium compound at first, then chlorinating the reaction product, and treating with a compound of Ti, V, Zr or Cr.

Japanese Patent L-O-P No. 35006/1985 discloses a catalyst composed of mono- di- or tricyclopentadienyl-transition metals (a) (transition metals being at least two different metals) or their derivatives and an alumoxane (aluminoxane) in combination. Example 1 of this Patent publication discloses that ethylene and propylene are polymerized to form a polyethylene in the presence of a catalyst composed of bis(pentamethylcyclopentadienyl)zirconiumdimethyl and an aluminoxane. In Example 2 of this Patent publication, ethylene and propylene are polymerized to form a polymer blend of a polyethylene and an ethylene/propylene copolymer in the presence of a catalyst composed of bis(pentamethylcyclopentadienyl)zirconiumdichloride, bis(methylcyclopentadienyl)zirconium dichloride and an alumoxane.

Japanese Patent L-O-P No. 35007/1985 discloses a process wherein ethylene alone is polymerized, or ethylene and an α-olefin of not less than 3 carbon atoms are copolymerized in the presence of metallocene, and a cyclic aluminoxane represented by the formula

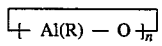

wherein R is an alkyl group of 1 to 5 carbon atoms, and n is an integer of 1 to about 20, or a linear aluminoxane represented by the formula

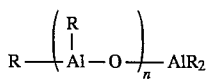

wherein R and n are as defined above.

Japanese Patent L-O-P No. 35008/1985 discloses a process for the preparation of a polyethylene or a copolymer of ethylene and a $C_3$–$C_{10}$ α-olefin, wherein a catalyst system comprising not less than two types of metallocene and an alumoxane is used.

Though the catalysts formed from a transition metal compound and an aluminoxane proposed by the prior art are excellent in polymerization activities, especially ethylene polymerization activities compared with those catalysts having been known prior to the appearance of these catalysts and formed from a transition metal compound and an organolauminum compound, most of the catalysts are soluble in the reaction system, and in most cases the processes for the preparation are limited to a solution polymerization system. In addition, the catalysts have such a problem that the productivity of a polymer is lowered due to a marked increase in the viscosity of the polymer-containing reaction solution when the manufacture of a polymer having a high molecular weight is tried, that the polymer obtained by after-treatment of polymerization has a low bulk specific gravity, and that the preparation of a sphere polymer having excellent particle properties is difficult.

On the other hand, polymerization of olefin has been tried in a suspension polymerization system or a gas phase polymerization system by using catalysts in which at least one of the transition metal compound component and the aluminoxane component described above is supported on a porous inorganic oxide carrier such as silica, alumina and silica-alumina.

For example, Japanese Patent L-O-P Nos. 35006/1985, 35007/1985 and 35008/1985 described above disclose that there can be used catalysts in which a transition metal compound and an aluminoxane are supported on silica, alumina, silica-alumina, etc.

Furthermore, Japanese Patent L-O-P Nos. 106808/1985 and 106809/1985 disclose a process for the preparation of a composition composed of an ethylene polymer and a filler, which process comprises polymerizing ethylene or copolymerizing ethylene and α-olefin in the presence of a product prepared by contacting a highly activated catalyst component comprising a hydrocarbon-soluble titanium compound and/or a zirconium compound with a filler, an organoaluminum compound and a filler having an affinity for polyolefin.

Japanese Patent L-O-P No. 31404/1986 discloses a process for polymerizing ethylene or copolymerizing ethylene and an α-olefin in the presence of a catalyst mixture composed of a transition metal compound and a product obtained by the reaction of trialkylaluminum and water in the presence of silicon dioxide or aluminum oxide.

Furthermore, Japanese Patent L-O-P No. 276805/1986 discloses that olefin is polymerized in the presence of a catalyst composed of a zirconium compound and a reaction mixture obtained by reacting an aluminoxane with trialkylaluminum at first, and further by reacting the resultant reaction mixture with such an inorganic oxide having a hydroxide group on the surface as silica.

Still furthermore, Japanese Patent L-O-P Nos. 108610/1986 and 296008/1986 discloses a process for polymerizing olefin in the presence of a catalyst in which a transition metal compound such as metallocene and an aluminoxane are supported on a carrier such as an inorganic oxide.

However, during the polymerization or copolymerization of olefin in a suspension or gas phase by using such a solid catalyst component supported on a carrier as described in the above-mentioned Patent publns., the catalyst component considerably lowers the polymerization activities compared with the above-described solution polymerization, and the resulting polymers do not have a satisfactory bulk density.

OBJECT OF THE INVENTION

The present invention is intended to solve such problems associated with the prior art technique as described above, and an object of the invention is to provide an ethylene/α-olefin copolymer being excellent in melt tension having a narrow composition distribution and being excellent in heat stability.

SUMMARY OF THE INVENTION

The ethylene/α-olefin copolymer according to the present invention is an ethylene copolymer comprising constituent units (a) derived from ethylene and constituent units (b) derived from an α-olefin having 3 to 20 carbon atoms, and is characterized in that:

(A) the ethylene/α-olefin copolymer has a density (d) of 0.88 to 0.95 g/cm$^3$;

(B) the ethylene/α-olefin copolymer has a MFR of 0.01 to 200 g/10 min as measured at a temperature of 190° C. and a load of 2.16 kg;

(C) the temperature (Tm) at which the endothermic curve of the ethylene/α-olefin copolymer measured by a differential scanning calorimeter (DSC) shows the highest peak and the density (d) satisfy the relation $Tm < 400d - 250$;

(D) the quantity fraction (W) of a n-decane-soluble component at room temperature satisfy the relation,
in the case of MFR $\leq$ 10 g/10 min., $W < 80 \times \exp(-100(d - 0.88)) + 0.1$, in the case of MFR > 10 g/min., $W < 80 \times (MFR - 9)^{0.35} \times \exp(-100(d - 0.88)) + 0.1$;

(E) the flow index (FI) defined by a shear rate which is given when a shear stress of molten copolymer at 190°

C. reaches $2.4 \times 10^6$ dyne/cm² satisfy the relation, $FI > 75 \times MFR$; and (F) the melt tension (MT) at 190° C. and MFR of the copolymer satisfy the relation, $3.98 \times MFR^{-0.66} > MT > 2 \times MFR^{-0.65}$.

BRIEF DESCRIPTION OF THE DRAWING

FIG. 1 shows a relationship between impact strength and blocking stress of a film prepared from the ethylene/α-olefin copolymer of the present invention. In FIG. 1, the number surrounded with a circle corresponds to the number of the working example of the invention, and the number surrounded with a lozenge corresponds to the number of the comparative example. It is confirmed that the ethylene copolymer/α-olefin copolymer of the invention has a good balance between the strength and the blocking stress, as compared with the comparative examples (excluding Comparative Example 3). The copolymer obtained in Comparative Example 3 is low in MT and FI and has extremely bad inflation moldability, though it has a good balance between the strength and the blocking stress.

DETAILED DESCRIPTION OF THE INVENTION

The ethylene/α-olefin copolymer according to the present invention is concretely illustrated below.

The ethylene/α-olefin copolymer according to the invention is a random copolymer of ethylene with an α-olefin having 3 to 20 carbon atoms. The ethylene/α-olefin copolymer has a density (d) of 0.880 to 0.950 g/cm³, preferably 0.885 to 0.940 g/cm³, more preferably 0.890 to 0.935 g/cm³.

The density is determined by means of a density gradient tube using the strand, which has been obtained at the time of MFR measurement at 190° C. under a load of 2.16 kg, and which is heat treated by heating at 120° C. for 1 hour and slowly cooling to room temperature over a period of 1 hour.

The ethylene/α-olefin copolymer as described above desirably comprises constituent units (a) derived from ethylene in an amount of 65 to 99% by weight, preferably 70 to 98% by weight, more preferably 75 to 96% by weight, constituent units (b) derived from an α-olefin having 3 to 20 carbon atoms in an amount of 1 to 35% by weight, preferably 2 to 30% by weight, more preferably 4 to 25% by weight.

The composition of the copolymer is usually determined by ¹³C-NMR spectrum analysis of a sample prepared by uniformly dissolving 200 mg of the copolymer in 1 ml of hexachlorobutadiene in a sample tube having a diameter of 10 mm under the following conditions: a measuring temperature of 120° C., a measuring frequency of 25.05 MHz, a spectrum width of 1500 Hz, a pulse repetition period of 4.2 sec and a pulse width of 6 μsec.

Examples of the α-olefin having 3 to 20 carbon atoms include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

The ethylene/α-olefin copolymer according to the present invention desirably has a MFR of 0.01 to 200 g/10 min, preferably 0.03 to 100 g/10 min, more preferably 0.05 to 50 g/10 min.

The determination of the MFR is carried out in accordance with ASTM D1238-65T, under the condition of a temperature at 190° C. and a load at 2.16 kg.

Furthermore, in the ethylene/α-olefin copolymer of the invention, the temperature (Tm) at which its endothermic curve measured by a differential scanning calorimeter (DSC) shows the highest peak, and its density (d) satisfy the following relation:

$TM < 400d - 250$, preferably $TM < 450d - 297$, more preferably $TM < 500d - 344$, particularly preferably $TM < 550d - 391$.

The copolymer of the present invention has been lower Tm compared with the ethylene copolymer polymerized by a conventional titanium catalyst having same density. Therefore, the copolymer of the present invention is excellent in heat sealability compared at same density.

In addition, measurement by DSC was carried out using a DSC-7 type apparatus manufactured by Perkin Elmer Co., Ltd. The temperature (Tm) at which the endothermic curve shows the maximum peak is sought from an endothermic curve obtained by filling about 5 mg of a sample in an aluminum pan, heating to 200° C. at a rate of 10° C./min, holding the sample at 200° C. for 5 minutes, lowering the temperature to room temperature at a rate of 20° C./min, and then heating at a rate of 10° C./min.

In the ethylene/α-olefin copolymer of the invention, the quantity fraction (W) of a n-decane-soluble component and the density of the copolymer at 23° C. satisfy the following relation:

in the case of MFR ≦ 10 g/10 min., $W < 80 \times \exp(-100(d - 0.88)) + 0.1$, preferably $W < 60 \times \exp(-100(d - 0.88)) + 0.1$, more preferably $W < 40 \times \exp(-100(d - 0.88)) + 0.1$, in the case of MFR ≧ 10 g/10 min., $W < 80 \times (MFR - 9)^{0.35} \times \exp(-100(d - 0.88)) + 0.1$.

It may be concluded from the relation between the temperature (Tm) and density (d), and the relation between the quantity fraction (W) of a n-decane-soluble component and density (d) that the ethylene copolymer of the present invention has a narrow composition distribution. Moreover, the n-decane-soluble component quantity is obtained by a procedure described below.

Measurement of the n-decane-soluble component quantity (polymer having a smaller soluble component quantity has a narrower composition distribution) is carried out by adding 3 g of the copolymer to 450 ml of n-decane, dissolving the copolymer at 145° C. cooling the solution to 23° C. removing a n-decane-insoluble component by filtering, and recovering a n-decane-soluble component from the filtrate.

In the ethylene/α-olefin copolymer of the present invention, the flow index (FI) defined by a shear rate which is given when a shear stress of molten copolymer at 90° C. reaches $2.4 \times 10^6$ dyne/cm² satisfy the relation, $FI > 75 \times MFR$, preferably $FI > 80 \times MFR$, more preferably $FI > 85 \times MFR$.

As described above, the ethylene/α-olefin copolymer of the present invention is high in flow index (FI), and has good moldability.

Furthermore, the melt tension (MT) and MFR of the ethylene/α-olefin copolymer of the invention satisfy the following relation:

$MT>2\times MFR^{-0.65}$, preferably $MT>2.3\times MFR^{-0.65}$, more preferably $MT>2.6\times MFR^{-0.65}$.

As described above, the ethylene copolymer of the invention is excellent in melt tension (MT), and has good moldability.

In addition, the melt tension (MT) is determined by measuring the stress of a molten copolymer while the molten copolymer is being stretched at a constant rate.

The ethylene/α-olefin copolymer of the invention desirably has an intrinsic viscosity [η] of 0.5 to 4.5 dl/g, preferably 0.6 to 4.0 dl/g, more preferably 0.7 to 0 3.5 dl/g.

Further, the number of unsaturated bond present in the molecule of the ethylene/α-olefin copolymer according to the present invention is preferably not more than 0.5 per 1,000 carbon atoms and is less than 1.0 per one molecule of the copolymer.

As described above, the ethylene/α-olefin copolymer of the present invention has so small number of unsaturated bond that the copolymer has excellent heat stability, since crosslinkage reaction is difficult to occur during heat processing.

Furthermore, the ethylene/α-olefin copolymer of the present invention normally has a molecular weight distribution (Mw/Mn), which is defined by a ratio of a weight average molecular weight (Mw) and a number average molecular weight (Mn), of 2.0 to 6.0.

The ethylene/α-olefin copolymer according to the present invention can be prepared by copolymerizing ethylene with an α-olefin having 3 to 20 carbon atoms in the presence of a compound of a transition metal in Group IV of the periodic table having ligands comprising specific substituted cyclopentadienyl group, an organoaluminum oxy-compound, a carrier, and, if necessary, an organoaluminum compound.

The ethylene copolymer according to the present invention having characteristics as described above can be prepared, for example, by copolymerizing ethylene with an α-olefin having 3 to 20 carbon atoms in the presence of a catalyst formed from (a) a transition metal compound represented by the formula $$MLx \qquad (1)$$

wherein M is a transition metal selected from the Group IV of the periodic table, L is a ligand coordinating to the transition metal, at least two of L are substituted cyclopentadienyl groups having 2–5 of substituent selected from methyl and ethyl, L other than the substituted cyclopentadienyl group is a hydrocarbon group of 1 to 12 carbon atoms, an alkoxy group, an aryloxy group, halogen, trialkylsilyl group or hydrogen, and x is a valance of the transition metal.

(b) an organoaluminum oxy-compound, and (c) a carrier, and if necessary, (d) an organoaluminum compound, so that the thus obtained copolymer has a density of 0.880 to 0.950 g/cm³.

In the above-mentioned formula (1), M is a transition metal, and concrete preferable examples of M include zirconium, titanium and hafnium. Of these, particularly preferred is zirconium.

L is a ligand coordinated to the transition metal, and at least two of them are substituted cyclopentadienyl groups having 2–5 of substituent selected from methyl and ethyl. Each of ligand may be the same or different. The substituted cyclopentadienyl groups are the substituted cyclopentadienyl groups having 2–5 of substituents, preferably the substituted cyclopentadienyl groups having 2 or 3 of substituents, more preferably the substituted cyclopentadienyl groups having two substituents, particularly the 1,3-substituted cyclopentadienyl groups. Each of substituent may be the same or different.

In the above-mentioned formula (1), L other than the substituted cyclopentadienyl group is a hydrocarbon group of 1 to 12 carbon atoms, an alkoxy group, an aryloxy group, halogen, trialkylsilyl group or hydrogen.

The transition metal compound represented by the general formula (1) include, for example,
Bis(dimethylcyclopentadienyl)zirconium dichloride,
Bis(diethylcyclopentadienyl)zirconium dichloride,
Bis(methylethylcyclopentadienyl)zirconium dichloride,
Bis(dimethylethylcyclopentatienyl)zirconium dichloride,
Bis(dimethylcyclopentadienyl)zirconium dibromide,
Bis(dimethylcyclopentadienyl)zirconium methoxychloride,
Bis(dimethylcyclopentadienyl)zirconium ethoxychloride,
Bis(dimethylcyclopentadienyl)zirconium butoxychloride,
Bis(dimethylcyclopentadienyl)zirconium diethoxide,
Bis(dimethylcyclopentadienyl)zirconium methylchloride,
Bis(dimethylcyclopentadienyl)zirconium dimethyl,
Bis(dimethylcyclopentadienyl)zirconium benzylchloride,
Bis(dimethylcyclopentadienyl)zirconium dibenzyl,
Bis(dimethylcyclopentadienyl)zirconium phenylchloride, and
Bis(dimethylcyclopentadienyl)zirconium hydridechloride.

In the above exemplified compounds, di-substituted cyclopentadienyl include 1,2- and 1,3-substituted, and tri-substituted include 1,2,3- and 1,2,4-substituted.

There may also be used transition metal compounds obtained by substituting titanium or hafnium for zirconium in the above-exemplified zirconium compounds.

In the above-mentioned transition metal compounds represented by the general formula (1), particularly preferred is
Bis(1,3-dimethylcyclopentadienyl)zirconium dichloride,
Bis(1, 3-diethylcyclopentadienyl)zirconium dichloride, or
Bis(1-methyl-3-ethylcyclopentadienyl)zirconium dichloride.

Next, the organoaluminum oxy-compound (b) is explained below.

The organoaluminum oxy-compound (b) may be a known aluminoxane or the benzene-insoluble organoaluminum oxy-compound having been disclosed in Japanese Patent L-O-P No. 276807/1990.

The above-mentioned aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerous chloride hydrate, and reacting the organoaluminum compound; and (2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran.

(3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include
trialkylaluminum such as trimethylaluminum, triethylaluminum, tripropylaluminum, triisopropylaluminum, tri-n-butylaluminum, triisobutylaluminum, tri-secbutylaluminum, tri-tert-butylaluminum, tripentylaluminum, trihexylaluminum, trioctylaluminum, tridecylaluminum, tricyclohexylaluminum and tricyclooctylaluminum;
dialkylaluminum halides such as dimethylaluminum chloride, diethylaluminum chloride, diethylaluminum bromide and diisobutylalumunum chloride;
dialkylaluminum hydrides such as diethylaluminum hydride and diisobutylaluminum hydride;
dialkylaluminum alkoxides such as dimethylaluminum methoxide and diethylaluminum ethoxide; and
dialkylaluminum aryloxides such as diethylaluminum phenoxide.

Of these compounds, trialkylaluminum is particularly preferable.

Furthermore, there may also be used as the organoaluminum compound isoprenylaluminum represented by the general formula

$(i-C_4H_9)_xAl_y(C_5H_{10})_z$ wherein x, y and z are each a positive number, and $z \geq 2x$.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons.

In addition, there may also be used ethers such as ethyl ether and tetrahydrofuran. Of these solvents as exemplified above, aromatic hydrocarbons are particularly preferred.

The benzene-insoluble organoaluminum oxy-compounds used in the invention contain an Al component soluble in benzene at 60° C. in an amount of not greater than 10%, preferably not greater than 5%, particularly preferably not greater than 2% in terms of Al atom, and they are insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing 4 times the solid portion separated on the filter with 50 ml of benzene at 60° C., and measuring the amount (×mmole) of Al atoms present in the whole filtrate.

The carrier used as a carrier of the catalyst component (c) is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, MgO, $ZrO_2$, $TiO_2$, $B_2O_3$, CaO, ZnO, BaO, $ThO_2$, or a mixture of these compounds such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these carriers, preferred are those comprising at least one compound selected from the group consisting of $SiO_2$ and $Al_2O_3$ as a major component.

Furthermore, the above-mentioned inorganic oxide or oxides may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BASO_4$, $KNO_3$, $Mg(NO_3)_2$, $Al(NO_3)_3$, $Na_2O$, $K_2O$ and $LiO_2$.

Though the porous inorganic carriers have different properties among them depending on the types and preparation methods thereof, the carriers preferably used in the invention have a specific surface area of 50 to 1000 m²/g, preferably 100 to 700 m²/g, a pore volume of desirably 0.3 to 2.5 cm³/g. The carriers are prepared if necessary by firing at a temperature of 150α to 1000° C., preferably 200° to 800° C.

Moreover, there can be mentioned organic compounds in solid granules or fine solid particles each having a particle size of 10 to 300 μm as carriers which can be used in the present invention. Examples of these organic compounds include (co)polymers containing as the main component constituent units derived from an α-olefin of 2 to 14 carbon atoms, such as ethylene, propylene, 1-butene and 4-methyl-1-pentene, or polymers or copolymers containing as the main component constituent units derived from vinylcyclohexane or styrene.

The catalyst used in the present invention may optionally contain (d) organoaluminum compound in addition to the above-mentioned (a) transition metal compound, (b) organoaluminum oxy-compound and (c) carrier.

Examples of the organoaluminum compound (d) optionally used herein include an organoaluminum compound represented by the formula

$R^1_nAlX_{3-n}$ wherein $R^1$ is a hydrocarbon group of 1 to 12 carbon atoms, X is halogen or hydrogen, and n is 1 to 3.

In the above formula, $R^1$ is a hydrocarbon group of 1 to 12 carbon atoms, for example, an alkyl group, a cycloalkyl group or an aryl group. Concrete examples of $R^1$ include methyl, ethyl, n-propyl, isopropyl, isobutyl, pentyl, hexyl, octyl, cyclopentyl, cyclohexyl, phenyl and tolyl.

Concrete examples of such organoaluminum compounds (d) include
trialkylaluminum such as trimethylaluminum, triethylaluminum, triisopropylaluminum, triisobutylaluminum, trioctylaluminum and tri-2-ethylhexylaluminum;
alkenylaluminum such as isoprenylaluminum;
dialkylaluminum halides such as dimethylaluminum chloride, diethylaluminum chloride, diisopropylaluminum chloride, diisobutylaluminum chloride and dimethylaluminum bromide;
alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Furthermore, there may also be used other organoaluminum compounds represented by the formula $$R^1{}_nAlY_{3-n}$$

wherein $R^1$ is as defined previously, Y is $-OR^2$, $-OSiR^3{}_3$, $-OAlR^4{}_2$, $-NR^5{}_2$, $-SiR^6{}_3$ or $-N(R^7)AlR^8{}_2$, n is 1 to 2, $R^2$, $R^3$, $R^4$ and $R^5$ are each methyl, ethyl, isopropyl, isobutyl, cyclohexyl or phenyl, $R^5$ is hydrogen, methyl, ethyl, isopropyl, phenyl or trimethylsilyl, $R^6$ and $R^7$ are each methyl or ethyl.

The organoaluminum compounds as mentioned above include, in concrete, such compounds as enumerated below.

(1) Compounds of the formula $R^1{}_nAl(OR^2)_{3-n}$ such as dimethylaluminum methoxide, diethylaluminum ethoxide and diisobutylaluminum methoxide.

(2) Compounds of the formula $R^1{}_nAl(OSiR^3{}_3)_{3-n}$ such as $Et_2Al(OSiMe_3)$, $(iso-Bu)_2Al(OSiMe_3)$ and $(iso-Bu)_2Al(OSiEt_3)$.

(3) Compounds of the formula $R^1{}_nAl(OAlR^4{}_2)_{3-n}$ such as $Et_2AlOAlEt_2$ and $(iso-Bu)_2AlOAl(iso-Bu)_2$.

(4) Compounds of the formula $R^1{}_nAl(NR^5{}_2)_{3-n}$ such as $Me_2AlNEt_2$, $Et_2AlNHMe$, $Me_2AlNHEt$, $Et_2AlN(SiMe_3)_2$, $(iso-Bu)_2AlN(SiMe_3)_2$.

(5) Compounds of the formula $R^1{}_nAl(SiR^6{}_3)_{3-n}$ such as $(iso-Bu)_2AlSiMe_3$.

(6) Compounds of the formula

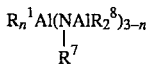

such as

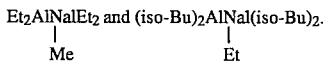

Of the organoaluminum compounds as exemplified above, preferred are those having the formulas

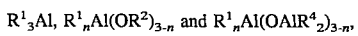

and particularly preferred are those having the above-mentioned formulas in which $R^2$ is isoalkyl and n is 2. These organoaluminum compounds may also be used in combination of two or more.

In the present invention, it is desirable that a catalyst formed by contacting the above-mentioned components (a), (b), (c) and if necessary, component (d). Though the mixing of these components (a)–(d) may be conducted in arbitrarily selected order, the mixing and contacting is preferably conducted in the order of:

mixing and contacting the components (b) and (c), followed by mixing and contacting the component (a), and if necessary, mixing and contacting the component (d).

The mixing of the above-mentioned components (a)–(d) can be carried out in an inert hydrocarbon.

As the inert hydrocarbon solvent, there may be mentioned an aliphatic hydrocarbon, such as propane, butane, pentane, hexane, heptane, octane, decane, dodecane and kerosene;

an alicyclic hydrocarbon, such as cyclopentane, cyclohexane and methylcyclohexane;

an aromatic hydrocarbon, such as benzene, toluene and xylene;

a halogenated hydrocarbon, such as ethylene chloride, chlorobenzene and dichloromethane; and a mixture thereof.

The component (a) is used usually in an amount of $5\times10^{-6}$ to $5\times10^{-4}$ mol, preferably $1\times10^{-5}$ to $2\times10^{-4}$ mol based on 1 g of the component (c), and the concentration thereof is $1\times10^{-4}$ to $2\times10^{-2}$ mol/l, preferably $2\times10^{-4}$ to $1\times10^{-2}$ mol/l. The atomic ratio (Al/transition metal) of the aluminum in the component (b) to the transition metal in the component (a) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5.

The components (a), (b) and (c), and if necessary, the component (d) are mixed at a temperature of usually $-50°$ to $150°$ C., preferably $-20°$ to $120°$ C., with a contact time of 1 minute to 50 hours, preferably 10 minutes to 25 hours. Also, when the mixing and contacting, the mixing temperature may be appropriately changed.

In the catalyst for olefin polymerization obtained as described above, it is desirable that the transition metal derived from component (a) is supported in an amount of $5\times10^{-6}$ to $5\times10^{-4}$ g atom, preferably $1\times10^{-5}$ to $2\times10^{-4}$ g atom, and aluminum derived from components (b) and (d) is supported in an amount of $10^{-3}$ to $5\times10^{-2}$ g atom, preferably $2\times10^{-3}$ to $2\times10^{-2}$ g atom, all the amounts being based on 1 g of the component (c).

Further, the catalyst used in the present invention may be a prepolymerized catalyst obtained by prepolymerization of olefin in the presence of the above-mentioned components (a), (b) and (c), and if necessary, (d).

The prepolymerized catalyst can be prepared by mixing the component (a), the component (b), the component (c), and if necessary, the component (d), introducing olefin to the resulting mixture in the inert hydrocarbon solvent, and carrying out prepolymerization.

The olefins which can be prepolymerized include ethylene and olefins each having 3 to 20 carbon atoms, for example, propylene, 1-butene, 1-pentene, 4-methyl-1-pentene, 1-hexene, 1-octene, 1-decene, 1-dodecene and 1-tetradecene. Of these, particularly preferred is ethylene or the combination of ethylene and α-olefin used in the polymerization.

During the prepolymerization, the component (a) is used usually in an amount of $5\times10^{-6}$ to $5\times10^{-4}$ mol, preferably $1\times10^{-5}$ to $2\times10^{-4}$ mol based on 1 g of the component (c), and the concentration thereof is $1\times10^{-6}$ to $2\times10^{-2}$ mol/l, preferably $5\times10^{-5}$ to $1\times10^{-2}$ mol/l. atomic ratio (Al/transition metal) of the aluminum in the component (b) to the transition metal in the component (a) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5. The prepolymerization is carried out at a temperature of $-20°$ to $80°$ C., preferably $0°$ to $60°$ C., with a time of 0.5 to 100 hours, preferably 1 to 50 hours.

The prepolymerized catalyst can be prepared as described below. First, the carrier (component (c)) is suspended in the inert hydrocarbon. To the suspension, the organoaluminum oxy-compound (component (b)) is introduced, and reacted for predetermined period. Successively, supernatant is removed, and the resulting solid component is re-suspended in the inert hydrocarbon. Into the system, the transition metal compound (component (a)) is added and reacted for predetermined period. Then, supernatant is removed to obtain a solid catalyst component. Continuously, the solid catalyst component obtained above is added into inert hydrocarbon containing the organoaluminum compound (component (d)), and olefin is introduced therein to obtain the prepolymerized catalyst.

An amount of prepolymerized polyolefin produced in the prepolymerization is, desirably based on 1 g of the carrier (c), of 0.1 to 500 g, preferably 0.2 to 300 g, more preferably 0.5 to 200 g. In the prepolymerized catalyst, component (a) is desirably supported in an amount in terms of transition metal atom, based on 1 g of the carrier (c), of about $5 \times 10^{-6}$ to $5 \times 10^{-4}$ g atom, preferably $1 \times 10^{-5}$ to $1 \times 10^{-4}$ g atom. Further, a molecular ratio (Al/M) of aluminum atom (Al) derived from components (b) and (d) to transition metal atom (M) derived from component (a) is usually 5 to 200, preferably 10 to 150.

The prepolymerization may be carried out either batchwise or continuously, and under reduced pressure, normal pressure or applied pressure. Though a molecular weight modifier such as hydrogen may be allowed to be present during prepolymerization, its amount is desirably restricted so that there can be prepared a prepolymer having an intrinsic viscosity [η] of 0.2 to 7 dl/g, preferably 0.5 to 10 dl/g as measured in decalin at 135° C.

The ethylene/α-olefin copolymers according to the present invention are obtained by copolymerizing ethylene with such an α-olefin having 3 to 20 carbon atoms as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the present invention, olefin is usually polymerized in a gas phase or liquid phase, for example, in slurry. In the slurry polymerization, an inactive hydrocarbon or the olefin itself may be used as a solvent.

Concrete examples of the hydrocarbon solvent include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil. Of these hydrocarbons, preferred are aliphatic hydrocarbons, alicyclic hydrocarbons and petroleum fractions.

In the present invention, the slurry polymerization is conducted at a temperature of usually −50° to 100° C., preferably 0° to 90° C.

In the present invention, the gas phase polymerization is carried out at a temperature of usually 0° to 120° C., preferably 20° to 100° C.

In the slurry polymerization or gas phase polymerization of the invention, the concentration of the transition metal compound is usually $10^{-8}$ to $10^{-3}$ g atom/liter, preferably $10^{-7}$ to $10^{-4}$ g atom/liter in terms of the transition metal.

Furthermore, in the polymerization of the invention, an aluminum oxy-compound or an aluminum compound similar to those used in the catalyst components (b) and (d) may be added. During the polymerization, the ratio of the aluminum compound in terms of Al atom to the transition metal atom (M) (Al/M) is 5 to 300, preferably 10 to 200, more preferably 15 to 150.

The polymerization is carried out usually at a normal pressure to 100 kg/cm², preferably under a pressure condition of 2 to 50 kg/cm². The polymerization can be carried out either batchwise, semicontinuously or continuously.

Furthermore, the polymerization may also be carried out in not less than 2 steps having reaction conditions different from each other.

The ethylene/α-olefin copolymer of the present invention can be used for films obtained by extrusion molding, pipes and tubes obtained by extrusion molding, fibers, containers obtained by blow molding, daily use miscellaneous goods obtained by injection molding, caps, and large-sized molded products obtained by rotational molding. Of these uses, the ethylene/α-olefin copolymer of the invention is suitable for films obtained by extrusion film molding, namely, inflation molding and T-die molding. Particularly, the ethylene/α-olefin copolymer of the invention is very suitable as resin for inflation molded films among the extrusion molded films. The inflation molded films are used for, for example, standard bags, heavy duty bags, wrapping films, materials for laminates, sugar bags, packaging bags for oily goods, packaging bags for moist goods, various packaging films for foods, agricultural materials and bags for liquid transportation. Further, the inflation molded films may also be used as multi-layer films by laminating the films on various substrates such as a nylon substrate and a polyester substrate.

The ethylene/α-olefin copolymer according to the invention may optionally contain various additives such as a weathering stabilizer, a heat stabilizer, an antistatic agent, an antislip agent, an antiblocking agent, an antidim agent, a lubricant, a pigment, a dye, a nucleating agent, a plasticizer, an age resistor, a hydrochloric acid absorbing agent, and an antioxidant, so long as the additives do not have an adverse effect. Further, some other high molecular compounds can be blended in a small amount within the spirit and scope of the invention.

The ethylene/α-olefin copolymer of the present invention is excellent in balance of melt tension and flowability, compared with conventional intermediate- or low-pressure ethylene copolymer. Therefore, the ethylene/α-olefin copolymer of the present invention shows considerably improved moldability during the extrusion molding. Further, the extrusion molded articles are excellent in transparency, impact strength, heat sealability and blocking property. Furthermore, the injection molded articles are excellent in strength properties such as impact strength and environmental stress resistance. The injection molded articles are also excellent in low-temperature properties.

The present invention is illustrated below with reference to examples, but it should be construed that the present invention is in no way limited to those examples.

Definition of physical properties of the ethylene/α-olefin copolymer, measuring methods of the physical properties and molding process of the ethylene/α-olefin copolymer, used in the invention, are described below.

(1) Granulation of ethylene/α-olefin copolymer

To a powdery ethylene copolymer obtained by gas phase polymerization were added 0.05% by weight of tri(2,4-di-t-butylphenyl)phosphate as a secondary antioxidant, 0.1% by weight of n-octadecyl-3-(4'-hydroxy-3',5'-di-t-butylphenyl)propionate as a heat-resistant stabilizer and 0.05% by weight of calcium stearate as a hydrochloric acid absorbing agent, each based on the amount (part(s) by weight) of the ethylene copolymer. Then, the resultant mixture was melt-extruded at a preset temperature of 180° C. using a conical-tapered twin-screw extruder (produced by Herque Co.), to prepare granulated pellets.

(2) Density

A strand of the copolymer obtained in MFR measurement at 190° C. under a load of 2.16 kg was heated at 120° C. over 1 hour and then slowly cooled to room temperature over 1 hour. Then, the density of the strand was measured by a density gradient tube.

(3) Composition of copolymer

The composition of the copolymer was determined by means of $^{13}$C-NMR spectrum analysis. That is, a $^{13}$C-NMR spectrum of a sample prepared by homogeneously dissolving about 200 mg of a powdery copolymer in 1 ml of hexachlorobutadiene in a sample tube of 10 mm$\phi$ was measured under the measuring conditions of a measuring temperature of 120° C., a measuring frequency of 25.05 MHz, a spectrum width of 1,500 Hz, a pulse repetition period of 4.2 sec and a pulse width of 6 μsec. Then, the spectrum was analyzed to determine the composition of the copolymer.

(4) MFR

The MFR (melt flow rate) of the copolymer was determined using granulated pellets of the copolymer in accordance with ASTM D1238-65T under the conditions of a temperature of 190° C. and a load of 2.16 kg.

(5) Intrinsic viscosity ([η])

The intrinsic viscosity [η] of the copolymer was measured in decalin at 135° C. That is, about 20 mg of granulated pellets of the copolymer was dissolved in 15 ml of decalin, and the resultant decalin solution was measured on the specific viscosity ηsp in an oil bath of 135° C. To the decalin solution was added 5 ml of a decalin solvent to dilute the solution, and then the solution thus diluted was measured on the specific viscosity ηsp in the same manner as described above. This diluting operation was further repeated twice, and the concentration (C) was extrapolated to 0 to obtain a value of ηsp/C as the intrinsic viscosity.

[η]=lim (ηsp/C) (C→0)

(6) Molecular weight distribution (Mw/Mn)

The molecular weight distribution was measured by GPC model ALC-GPC-150C produced by Waters Co. This measurement was carried out at 140° C. using a column of PSK-GMH-HT produced by Toyo Soda Mfg. Co., Ltd. and using orthodichlorobenzene (ODCB) as a solvent.

(7) Maximum peak temperature (Tm) by DSC

The maximum peak temperature (Tm) was measured using a DSC-7 type apparatus produced by Perkin Elmer Co. That is, the temperature (Tm) at the maximum peak position of the endothermic curve was sought from an endothermic curve obtained by filling about 5 mg of a sample in an aluminum pan, elevating the temperature to 200° C. at a rate of 10° C./min, holding the sample at 200° C. for 5 minutes, lowering the temperature to room temperature at a rate of 20° C./min and elevating the temperature at a rate of 10° C.

(8) Amount of n-decane-soluble component (W)

The amount of a n-decane-soluble component was measured by adding about 3 g of the copolymer to 450 ml of n-decane to dissolve the copolymer in n-decane at 145° C., cooling the resultant solution to 23° C. filtering the solution to remove a n-decane-insoluble portion of the copolymer and recovering a n-decane-soluble portion from the filtrate. The amount of the n-decane-soluble portion is determined by the following formula.

Weight of n-decane-soluble portion/Weight of n-decane-insoluble and n-decane-soluble portions ×100%

A copolymer having a smaller amount of a n-decanesoluble component has a narrower composition distribution.

(9) Melt tension (MT)

The melt tension was determined by measuring a stress given when a molten polymer was stretched at a constant rate. That is, granulated pellets of the copolymer were used as a measuring sample, and the measurement was carried out under the conditions of a resin temperature of 190° C., an extrusion rate of 15 mm/min and a take-up rate of 10 to 20 m/min using a MT measuring apparatus (produced by Toyo Seiki Seisakusho K.K.) having a nozzle diameter of 2.09 mm$\phi$ and a nozzle length of 8 mm.

(10) Flow index (FI)

A flow index (FI) is defined by a shear rate which is given when a shear stress reaches $2.4 \times 10^6$ dyne/cm$^2$ at 190° C. The flow index (FI) was determined by extruding a resin from a capillary while changing a shear rate and measuring the shear rate given when the shear stress reaches the above-mentioned value. In this measurement, the same sample as described in the above-mentioned MT measurement was used, and the measurement was carried out under the conditions of a resin temperature of 190° C. and a shear stress of about $5 \times 10^4$ to $3 \times 10^6$ dyne/cm$^2$ using a capillary type flow property testing machine produced by Toyo Seiki Seisakusho K.K.

In the measurement, a diameter of the nozzle was changed as follows depending on MFR (g/10min) of the resin to be measured.

MFR>20: 0.5 mm

20≧MFR>3: 1.0 mm

3≧MFR>0.8: 2.0 mm 0.8≧MFR: 3.0m

(11) Film forming process

Granulated pellets of the copolymer were used as a sample, and the sample was extruded by a single-screw extruder (20 mm$\phi$.L/D=28) equipped with a die of 25 mm$\phi$ (lip width: 0.7 mm) and a single-slit air ring under the conditions of an air flow rate of 90 1/min, an extrusion rate of 9 g/min, a blow ratio of 1.8, a take-up rate of 2.4 m/min and a processing temperature of 200° C., to prepare a film having a thickness of 30 μm.

(12) Evaluation on physical properties of film (a) Haze (haze value)

The haze value was measured in accordance with ASTM-D-1003-61.

(b) Gloss (glossiness)

The glossiness was measured in accordance with JIS Z8741.

(c) Impact strength

The impact strength of the film was measured by a pendulum type film impact tester produced by Toyo Seiki Seisakusho K.K.

(d) Blocking properties

An inflation film having a size of 10×20 cm was sandwiched between two sheets of typing paper, then further sandwiched between glass plates, and a load of 10 kg was applied to them in an air bath of 50° C. for 24 hours. Then, they were fitted to an open type receiving tool to separate the film. When a load at the time when the film is separated is A g, the blocking force F (g/cm) is determined by the following formula.

*F=A/width of sample*

Example 1

[Preparation of catalyst component]

7.9 kg of silica having been dried at 250° C. for 10 hours was suspended in 121 liters of toluene, and the resultant suspension was cooled to 0° C. Thereafter, to the suspension was dropwise added a toluene solution of methylaluminoxane (Al=1.47 mol/liter) over 1 hour. During the addition, the temperature of the system was kept at 0° C. Successively, the reaction was carried out at 0° C. for 30 minutes. Then, the temperature of the system was elevated to 95° C. over 1.5 hours, and the reaction was carried out at the same temperature for 4 hours. Thereafter, the temperature of the system was lowered to 60° C., and the supernatant liquid was removed by decantation. The solid component obtained in the above was washed twice with toluene, and then again suspended in 125 liters of toluene. To the reaction system was dropwise added 20 liters of a toluene solution of bis(1,3-dimethylcyclopentadienyl)zirconium dichloride (Zr=28.4 mmol/l) at 30° C. over 30 minutes, and the reaction was further carried out at 30° C. for 2 hours. Then, the supernatant liquid was removed, and the residue was washed twice with hexane to obtain a solid catalyst containing 4.6 mg of zirconium per 1 g of the solid catalyst.

[Preparation of prepolymerized catalyst]

To 160 liters of hexane containing 16 mol of triisobutylaluminum was added 4.3 kg of the solid catalyst obtained in the above, and the resultant mixture was subjected to prepolymerization with ethylene at 35° C. for 3.5 hours to obtain a prepolymerized catalyst in which an ethylene polymer was prepolymerized on the solid catalyst in an amount of 3 g per 1 g of the solid catalyst. The ethylene polymer had an intrinsic viscosity [η] of 1.27 dl/g.

[Polymerization]

In a fluidized bed gas phase polymerizer of continuous type, ethylene was copolymerized with 1-hexene at a total pressure of 20 kg/cm$^2$-G and a polymerization temperature of 80° C. To the polymerizer were continuously fed the prepolymerzied catalyst prepared in the above at a feed rate of 0.05 mmol/hour in terms of zirconium atom and triisobutylaluminum at a feed rate of 10 mmol/hour while continuously feeding ethylene, 1-hexene, hydrogen and nitrogen to maintain a constant gas composition in the polymerizer (gas composition: 1-hexene/ethylene =0.018, hydrogen/ethylene=0.0012, ethylene concentration =25%). Thus, a polymer was obtained in an amount of 5.2 kg/hour.

The detailed results of analysis of the polymer thus obtained are set forth in Table 1. The polymer had a density of 0.927 g/cm$^3$ and a MFR of 1.0 g/10 min. The number of unsaturated bond in the polymer was 0.062 per 1,000 carbon atoms, and was 0.11 per one molecule of the polymer. The maximum peak of the DSC endothermic curve was exhibited at 117.8° C. and the amount of the decane-soluble component was 0.22% by weight at room temperature.

Examples 2–6

The procedure of polymerization in Example 1 was repeated by using the prepolymerized catalyst prepared in Example 1 except for using various α-olefins set forth in Table 1 as comonomers, to obtain ethylene copolymers. The results of analysis of the ethylene copolymers and the results of evaluation of inflation films prepared from the ethylene copolymers are set forth in Table 1.

Comparative Example 1

A copolymer of ethylene and 4-methyl-pentene-1 was prepared in a cyclohexane solvent using a $MgCl_2$-carrier supported Ti catalyst. The results of analysis of the copolymer thus obtained and the results of evaluation of an inflation film prepared from the copolymer are set forth in Table 1. As is evident from the comparison with the results of Example 4 wherein the same 4-methylpentene-1 was used as a comonomer and the values of MFR and density were almost the same as those of this comparative example, this copolymer had a large amount of the n-decane-soluble portion, a high Tm value, and a bad balance between FI and MT. Further, as is evident from the results of film evaluation, all properties of haze, impact strength and blocking properties were deteriorated.

Comparative Example 2

A copolymer of ethylene and hexene-1 was prepared in a gas phase using a $MgCl_2$-carrier supported Ti catalyst. The results of analysis of the copolymer thus obtained and the results of evaluation of an inflation film prepared from the copolymer are set forth in Table 1. As is evident from the comparison with the results of Example 2 wherein the same hexene-1 was used as a comonomer and the values of MFR and density were almost the same as those of this comparative example, this copolymer had a large amount of the n-decane-soluble portion, a high Tm value, and a bad balance between FI and MT. Further, as is evident from the results of film evaluation, all properties of haze, impact strength and blocking properties were deteriorated.

Comparative Example.3

The procedure of example 1 was repeated except that bis(3-n-butylcyclopentadienyl)zirconium dichloride was used as a zirconium compound instead of bis(1,3-dimethylcyclopentadienyl)zirconium dichloride in the preparation of a catalyst component in Example 1, to prepare an ethylene copolymer shown in Table 1.

This copolymer showed bad moldability as compared with the result of Example 6 wherein the values of MFR and density were almost same as those of this comparative example.

TABLE 1

| | Comonomer | | MFR | [η] | | Density | n-decane soluble portion | Tm | Formula |
| | Kind | Content Mol % | g/10min | dl/g | Mw/Mn | g/cm$^3$ | wt % | °C. | (1) |
| --- | --- | --- | --- | --- | --- | --- | --- | --- | --- |
| Ex. 1 | 1-hexene | 1.9 | 1.0 | 1.61 | 3.0 | 0.927 | 0.22 | 117.8 | 120.8 |
| Ex. 2 | 1-hexene | 2.5 | 1.0 | 1.60 | 2.9 | 0.922 | 0.26 | 111.2 | 118.8 |

TABLE 1-continued

| | | | | | | | | | |
|---|---|---|---|---|---|---|---|---|---|
| Ex. 3 | 1-pentene | 2.6 | 2.1 | 1.41 | 2.9 | 0.920 | 0.08 | 111.9 | 118.0 |
| Ex. 4 | 4-methyl-pentene-1 | 2.3 | 2.0 | 1.44 | 3.0 | 0.921 | 0.25 | 112.0 | 118.4 |
| Ex. 5 | 1-butene | 2.5 | 2.0 | 1.46 | 2.7 | 0.926 | 0.57 | 111.5 | 120.4 |
| Ex. 6 | 1-hexene | 3.0 | 2.0 | 1.42 | 2.9 | 0.920 | 0.47 | 111.2 | 118.0 |
| Comp Ex. 1 | 4-methyl-pentene-1 | 2.5 | 2.0 | 1.67 | 3.2 | 0.922 | 1.9 | 123.5 | 118.8 |
| Comp Ex. 2 | 1-hexene | 3.6 | 1.0 | 1.91 | 4.1 | 0.922 | 7.9 | 123.2 | 118.8 |
| Comp Ex. 3 | 1-hexene | 3.0 | 2.4 | 1.55 | 2.6 | 0.922 | 0.25 | 114.8 | 118.8 |

| | | | | | Physical properties of film | | | |
|---|---|---|---|---|---|---|---|---|
| | MT g | Formula (2) | Formula (3) | FI $S^{-1}$ | Haze % | Gloss % | Impact strength kg · cm/cm | Block-ing g/cm | Molda-bility* |
| Ex. 1 | 3.2 | 2.0 | 3.98 | 180 | 10.0 | 44 | 2,210 | 0 | AA |
| Ex. 2 | 3.6 | 2.0 | 3.98 | 200 | 8.2 | 62 | 5,830 | 0.15 | AA |
| Ex. 3 | 1.7 | 1.23 | 2.44 | 270 | 7.4 | 68 | 2,730 | 0.27 | CC |
| Ex. 4 | 1.9 | 1.27 | 2.51 | 280 | 7.9 | 62 | 3,070 | 0.13 | CC |
| Ex. 5 | 1.9 | 1.27 | 2.51 | 270 | 6.8 | 68 | 1,790 | 0.78 | CC |
| Ex. 6 | 1.8 | 1.27 | 2.51 | 290 | 9.5 | 49 | 3,540 | 0.21 | CC |
| Comp Ex. 1 | 1.4 | 1.27 | 2.51 | 250 | 9.8 | 55 | 2,740 | 0.83 | CC |
| Comp Ex. 2 | 1.8 | 2.0 | 3.98 | 190 | 11.5 | 44 | 3,400 | 4.0 | CC |
| Comp Ex. 3 | 0.7 | 1.13 | 2.23 | 150 | 9.0 | 58 | 7,600 | 0.18 | DD |

Formula (1): Tm = 400d − 250
In the above formula, Tm is a temperature at the maximum peak of the endothermic curve measured by DSC, and d is a density.
Formula (2): MT = 2 × MFR$^{-0.65}$
Formula (3): MT = 3.98 × MFR$^{-0.66}$
In the above formulas, MT and MFR are a melt tension and a melt flow rate, respectively, at 190° C. Moldability* (bubble stability)
AA: very good
BB: good
CC: relatively good
DD: bad

What is claimed is:

1. A film formed from an ethylene/α-olefin copolymer comprising constituent units (a) derived from ethylene and constitutuent units (b) derived from an α-olefin having a 3 to 20 carbon atoms, which is characterized in that:

(A) the ethylene/α-olefin copolymer has a density (d) of 0.88 to 0.95 g/cm$_3$;

(B) the ethylene/α-olefin copolymer has a MFR of 0.05 to 50 g/10 min as measured at a temperature of 190° C. and a load of 2.16 kg;

(C) the temperature (Tm) at which the endothermic curve of the ethylene/α-olefin copolymer measured by a differential scanning calorimeter (DSC) shows the highest peak and the density (d) satisfy the relation $Tm < 400d - 250$;

(D) the quantity fraction (W) of a n-decane-soluble component at room temperature satisfy the relation, in the case of MFR≦10 g/10 min., $W < 80 \times \exp(-100(d-0.88)) + 0.1$ in the case of MFR≧10 g/10 min., $W < 80 \times (MFR-9)^{0.35} \times \exp(-100(d-0.88)) + 0.1$;

(E) the flow index (FI) defined by a shear rate which is given when a shear stress of molten copolymer at 190° C. reaches 2.4×10$^6$ dyne/cm$^2$ satisfy the relation, $FI > 75 \times MFR$; and (F) the melt tension (MT) at 190° C. and MFR of the copolymer satisfy the relation, $3.98 \times MFR^{-0.66} > MT > 2 \times MFR^{-0.65}$.

2. The film as claimed in claim 1, wherein the ethylene/α-olefin copolymer comprises the constituent units derived from ethylene in an amount of 65 to 99% by weight, and the constituent units derived from an α-olefin in an amount of 1 to 35% by weight.

3. The film as claimed in claim 1 wherein the ethylene/α-olefin copolymer is obtained by copolymerizing ethylene and α-olefin in the presence of catalyst formed from, (a) a transition metal compound represented by the formula $$ML_x \quad (1)$$

wherein M is a transition metal selected from the Group IV of the periodic table, L is a ligand coordinating to the transition metal, at least two of L are substituted cyclopentadienyl groups having 2–5 of substituent selected from the group consisting of methyl and ethyl, L other than the substituted cyclopentadienyl group is a hydrocarbon group of 1 to 12 carbon atoms, an alkoxy group, an aryloxy group, halogen, trialkylsilyl group or hydrogen, and x is a valance of the transition metal,
(b) an organoaluminum oxy-compound, and
(c) a carrier.

4. The film as claimed in claim 3, wherein the catalyst further contains (d) an organoaluminum compound.

5. The film as claimed in claim 1 wherein said film is obtained by inflation molding of said ethylene/α-olefin copolymer.

* * * * *